(No Model.)

J. A. O'NEILL.
COUPLING FOR LIGHT FIXTURES.

No. 488,946. Patented Dec. 27, 1892.

Witnesses.
Fred H Ashworth.
John C. Edwards.

Inventor.
James A. O'Neill
by Crosby & Gregory
Attys.

UNITED STATES PATENT OFFICE.

JAMES A. O'NEILL, OF BOSTON, MASSACHUSETTS, ASSIGNOR OF ONE-HALF TO JOHN C. HALLINGS, OF SAME PLACE.

COUPLING FOR LIGHT-FIXTURES.

SPECIFICATION forming part of Letters Patent No. 488,946, dated December 27, 1892.

Application filed July 23, 1892. Serial No. 441,007. (No model.)

*To all whom it may concern:*

Be it known that I, JAMES A. O'NEILL, of Boston, county of Suffolk, State of Massachusetts, have invented an Improvement in Couplings for Light-Fixtures, of which the following description, in connection with the accompanying drawings, is a specification, like letters on the drawings representing like parts.

This invention has for its object the production of a coupling adapted for use with gas or combined gas and electric light fixtures, and which, by its simplicity and small number of parts, is quickly and easily applied and adjusted.

In my invention I make use of a ball and socket joint, and by my improved construction I am enabled to dispense with the expensive grinding which has heretofore been necessary to make such coupling tight when used for gas fixtures.

Figure 1:
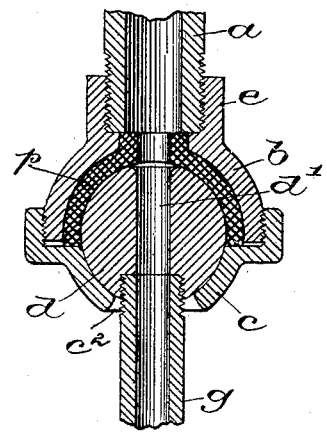
Figure 2:
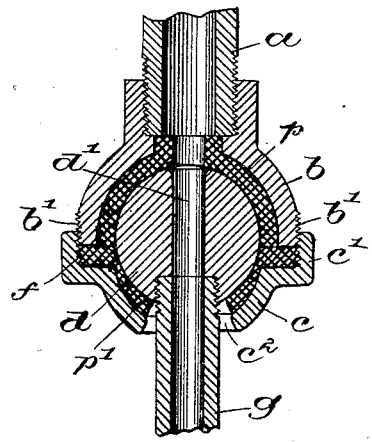

Figure 1, in vertical section shows my improved form of coupling, for use with gas alone; and Fig. 2, shows the same for use with gas or electricity, or both.

In the drawings, $a$, is the gas pipe externally screw-threaded, and extended from the wall or ceiling in usual manner, the coupling being secured to said threaded portion, as shown.

The coupling, as herein shown, is composed of the two-part casing $b$, $c$, and the ball portion $d$, having the gas passage $d'$, and adapted to receive the hollow stem $g$. The part $b$ of the casing is substantially spherical, suitably screw-threaded at its base, as at $b'$, and provided with an annular nipple or extension $e$, herein shown as threaded to engage the threaded portion of the pipe $a$. The part $c$ of the casing is also spherical, and has an upwardly extended flange $c'$ offset therefrom, and screw-threaded as at $f$ to engage the threaded portion $b'$ of the part $b$. An opening $c^2$ admits the stem $g$ leading from the ball $d$ to the chandelier or other fixture. The interior of the part $b$ is made larger than the ball, and a gas tight packing ring $p$ is placed between them, it having a gas opening $o$ therein. Viewing Fig. 1, it will be seen that with the part $b$ in place on the gas pipe, and the packing ring $p$ inserted, the part $c$ with the ball $d$ resting loosely therein and with the stem $g$ extended through the opening $c^2$ can be screwed upon the part $b$, until the ball is brought up against the packing ring, compressing it and making a perfectly gas tight joint. The ball fits snugly in the part $c$, as shown, but no grinding whatever is required either of the ball or parts $c$ or $b$, as the packing intermediate the ball and part $b$ effectually and completely stops the passage of gas. While the joint is thus closed the ball is held firmly in place by the packing and casing, one and the same operation performing both functions, and if the coupling is on a ceiling pipe the weight of the stem $g$ will cause it to assume a correct vertical position. If it is desired to make an insulating coupling, a second packing ring $p'$ of insulating material is placed between the ball and part $c$, as shown in Fig. 2, and the ball with its attached pipe is completely insulated from the rest of the coupling, the ring $p$ also being composed of insulating material. The pressure upon the packing is regulated by screwing the part $c$ more or less tightly upon the part $b$.

The parts of the coupling are readily cast, and as they require no grinding can be made very cheaply. Herein the stem $g$ is shown as screwed into the ball, but it might form an integral part of the ball.

Having described my invention, what I claim and desire to secure by Letters Patent, is:—

1. In a coupling for gas and electric light fixtures, a separable casing comprising interiorly spherical fixed and movable parts, a ball therein having a gas passage and a hollow stem extended through an opening in the movable part of the casing, and means to adjustably connect said parts, combined with a yielding gas tight packing filling the space between the ball and spherical interior of the fixed part, and a supporting nipple on the fixed part registering with the gas passage and with an opening in the packing, substantially as described.

2. In a coupling for light fixtures, a two-part separable casing, a ball therein having a gas passage, and means to connect the parts of the casing, combined with insulating packing rings interposed between the ball and both parts of the casing, substantially as described.

In testimony whereof I have signed my name to this specification in the presence of two subscribing witnesses.

JAMES A. O'NEILL.

Witnesses:
G. W. GREGORY,
JOHN C. EDWARD.